(12) United States Patent
Mansoor

(10) Patent No.: US 10,789,277 B2
(45) Date of Patent: Sep. 29, 2020

(54) SYSTEMS METHODS, AND APPARATUSES FOR CREATING, LINKING AND DISCOVERING BUSINESS NAVIGATION MAPS FOR ANALYZING DATA

(71) Applicant: Aera Technology, Inc., Mountain View, CA (US)

(72) Inventor: Shariq Mansoor, Dublin, CA (US)

(73) Assignee: Aera Technology, Inc., Mountain View, CA (US)

( * ) Notice: Subject to any disclaimer, the term of this patent is extended or adjusted under 35 U.S.C. 154(b) by 0 days.

(21) Appl. No.: 16/109,159

(22) Filed: Aug. 22, 2018

(65) Prior Publication Data
US 2018/0365312 A1  Dec. 20, 2018

Related U.S. Application Data

(63) Continuation of application No. 14/939,328, filed on Nov. 12, 2015, now abandoned, which is a
(Continued)

(51) Int. Cl.
*G06Q 10/06* (2012.01)
*G06Q 10/08* (2012.01)
(Continued)

(52) U.S. Cl.
CPC ...... *G06F 16/288* (2019.01); *G06F 16/24573* (2019.01); *G06F 16/285* (2019.01); *G06Q 10/06316* (2013.01); *G06Q 10/10* (2013.01)

(58) Field of Classification Search
CPC ........ G06Q 10/10; G06Q 10/08; G06Q 10/06; G06Q 40/02
(Continued)

(56) References Cited

U.S. PATENT DOCUMENTS

2005/0144096 A1* 6/2005 Caramanna, II ....... G06Q 40/06
705/30
2006/0129415 A1* 6/2006 Thukral ............... G06Q 10/087
705/28
(Continued)

*Primary Examiner* — Nga B Nguyen
(74) *Attorney, Agent, or Firm* — Omair M. Farooqui; Aziz M. Ahsan; Palo Alto Legal Group, P.C.

(57) ABSTRACT

The present invention includes a method, apparatus, and a system for creating business navigation maps comprising a host module linked to at least one computer, and at least one data base and/or data storage device, the host module being adapted to receive data point markers about at least one data point of interest to a user and including a data input link for receiving information about at least one data point of interest, a first logic processing module programmed to associate at least one data point of interest with at least one business report, wherein the logic processing module uses predefined criteria to tag the at least one data point of interest as relevant to the at least one business report; and a database module, the database module being adapted to store and obtain the at least one data point of interest, data point markers, and the at least one business report. The present invention also includes a method for navigating through business reports using at least one data point of interest and associating at least one data point of interest to a user with at least one business report, by adapting a logic processing module using predefined criteria to tag the at least one data point of interest as relevant to the at least one business report, and accessing a database module to store and obtain the at least one data point of interest, at least one data point marker, and the at least one business report.

20 Claims, 14 Drawing Sheets

Related U.S. Application Data continuation-in-part of application No. 13/629,582, filed on Sep. 27, 2012, now abandoned.

(60) Provisional application No. 61/539,926, filed on Sep. 27, 2011.

(51) Int. Cl.
 *G06Q 10/10* (2012.01)
 *G06F 16/28* (2019.01)
 *G06F 16/2457* (2019.01)

(58) Field of Classification Search
 USPC .................................................. 705/7.26
 See application file for complete search history.

(56) References Cited

U.S. PATENT DOCUMENTS

| | | | | |
|---|---|---|---|---|
| 2007/0088636 A1* | 4/2007 | Nault | ............... | G06Q 40/02 |
| | | | | 705/30 |
| 2008/0250157 A1* | 10/2008 | Ohata | ............... | G06Q 10/10 |
| | | | | 709/236 |
| 2010/0145945 A1* | 6/2010 | Episale | ............... | G06Q 10/10 |
| | | | | 707/736 |
| 2012/0158642 A1* | 6/2012 | Ebrahimi | ............... | G06F 8/30 |
| | | | | 707/600 |
| 2012/0259752 A1* | 10/2012 | Agee | ............... | G06Q 40/00 |
| | | | | 705/35 |

* cited by examiner

SYSTEMS METHODS, AND APPARATUSES FOR CREATING, LINKING AND DISCOVERING BUSINESS NAVIGATION MAPS FOR ANALYZING DATA

CROSS-REFERENCE TO RELATED APPLICATIONS

The instant patent application claims priority to and the benefit of pending U.S. patent application Ser. No. 14/939,328, filed on Nov. 12, 2015, titled "Systems, Methods, and Apparatuses for Creating, Linking and Discovering Navigation Maps for Analyzing Data", and which was a Continuation-In-Part of U.S. patent application Ser. No. 13/629,582, filed on Sep. 27, 2012, titled "Systems, Methods, and Apparatuses for Creating, Linking and Discovering Navigation Maps for Analyzing Data,", and which claimed priority to U.S. Provisional Patent Application Ser. No. 61/539,926, filed on Sep. 27, 2011, the entire disclosures of each patent application is incorporated herein by reference.

FIELD OF THE INVENTION

The present invention relates generally to a system, method, and apparatus for creating, linking, and discovering business navigation maps for analyzing data. More particularly, the invention relates to navigation through complex data, and more particularly to providing systems and methods to navigate through business reports and enable review of the relationships between multiple business reports.

BACKGROUND INFORMATION

Current methods for linking business reports are very limited and don't provide an easy way to navigate complex data. Hard coded drill downloads or pre-determined hierarchies are a major limitation with current business intelligence software, as there is no way to discover the relationships between business reports dynamically and move forward and backward between reports. The novel method presented herein provides for a distinct way to navigate business reports.

This invention improves on the deficiencies of the prior art and provides an inventive system, method, and apparatus for creating, linking, and discovering business navigation maps for analyzing data.

PURPOSES AND SUMMARY OF THE INVENTION

The invention is a novel system, method, and apparatus for creating, linking, and discovering business navigation maps for analyzing data.

An aspect of the present invention includes a system for creating business navigation maps comprising a host module linked to at least one computer, and at least one data base and/or data storage device, said host module being adapted to receive data point markers about at least one data point of interest to a user and including a data input link for receiving information about said at least one data point of interest, a first logic processing module programmed to associate at least one data point of interest with at least one business report, wherein said logic processing module uses predefined criteria to tag the at least one data point of interest as relevant to the at least one business report; and a database module, said database module being adapted to store and obtain the at least one data point of interest, data point markers, and the at least one business report.

Another aspect of the present invention includes a method for navigating through business reports, comprising adapting a host module to receive data point markers about at least one data point of interest to a user, providing a data input link for receiving information about the at least one data point of interest, associating at least one data point of interest with at least one business report, by adapting a logic processing module using predefined criteria to tag the at least one data point of interest as relevant to the at least one business report, and accessing a database module to store and obtain the at least one data point of interest, at least one data point marker, and the at least one business report.

Therefore, in one aspect this invention comprises an apparatus for creating business navigation map, comprising:
 providing at least one computer in electrical connection with at least one database and at least one storage device, said at least one computer in communication with at least one processor and at least one host module,
 generating a business report of interest containing data points;
 providing from a user using said at least one computer predefined criteria for data point markers about at least one data point of interest and adapting said at least one host module to receive said data point markers about at least one data point of interest,
 said user providing a data input link for receiving information about said at least one data point of interest from other business reports containing data points stored in said at least one storage device, said data input link being either:
 a static link manually linking said business reports that have common data point markers, or
 a dynamic link automatically linking said business reports using that have common data point markers;
 establishing a criteria to efficiently determine whether said at least one data point of interest from said other business reports is contained within said at least one business report of interest, by adapting at least one first logic processing module in communication with said at least one computer and programmed to associate said at least one data point of interest with said at least one business report of interest using said predefined criteria,
 when said at least one data point of interest is contained within said at least one business report of interest, tagging said at least one data point of interest as relevant to said at least one business report of interest so as to provide a faster search for said user; and
 accessing said at least one database module, to store and obtain said at least one data point of interest, at least one data point marker, and said at least one business report of interest.

In another aspect this invention comprises a method for navigating through business reports, comprising:
 providing at least one computer in electrical connection with at least one database and at least one storage device, said at least one computer in communication with at least one processor and at least one host module,
 generating a business report of interest containing data points;
 providing from a user using said at least one computer predefined criteria for data point markers about at least one data point of interest and adapting said at least one host module to receive said data point markers about at least one data point of interest;

providing by said user a data input link for receiving information about the at least one data point of interest from other business reports containing data points stored in said at least one storage device, said data input link being either a static link manually linking said business reports that have common data point markers, or a dynamic link automatically linking said business reports using that have common data point markers;

establishing a criteria to efficiently determine whether said at least one data point of interest from said other business reports is contained within said at least one business report of interest, by adapting at least one logic processing module using said predefined criteria;

when said at least one data point of interest is contained within said at least one business report of interest, tagging the at least one data point of interest as relevant to the at least one business report of interest so as to provide a faster search for said user; and providing at least one database module, said at least one database module in communication with said at least one computer; and accessing said at least one database module to store and obtain the at least one data point of interest, at least one data point marker, and the at least one business report of interest.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the drawings in which.

DETAILED DESCRIPTION

The inventive system, method, and apparatus for creating, linking, and discovering business navigation maps for analyzing data 23, will now be discussed with reference to FIGS. 1 through 14.

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as systems, methods or devices. The following detailed description should not to be taken in a limiting sense. Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention. In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." The term "coupled" implies that the elements may be directly connected together or may be coupled through one or more intervening elements. Further reference may be made to an embodiment where a component is implemented and multiple like or identical components are implemented.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

Figure 1:
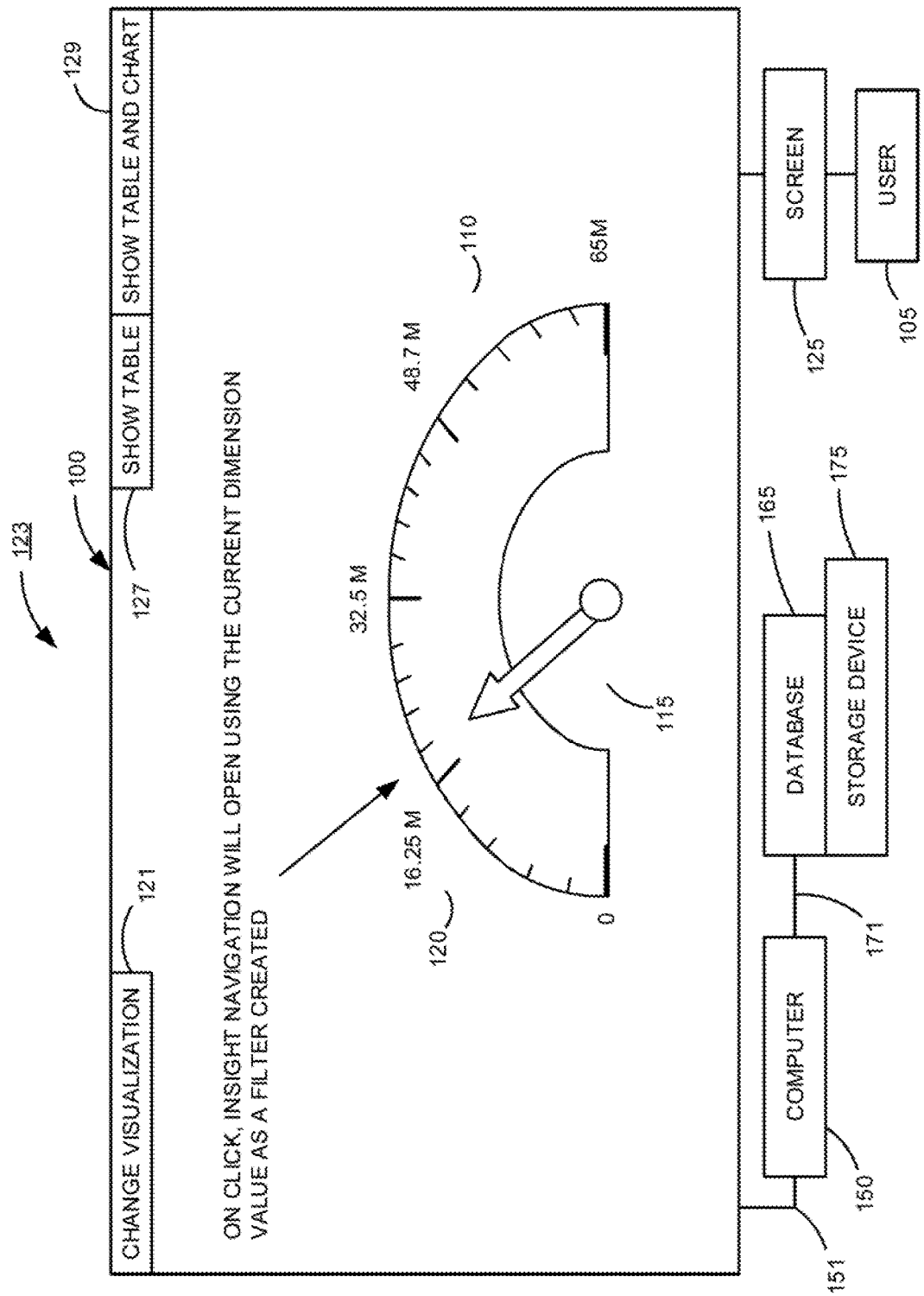
FIG. 1 illustrates a graphical representation of a value represented by one or more various parameters in accordance, with an embodiment of the present invention.

FIG. 1 depicts an embodiment of the inventive system, method, and apparatus for creating, linking, and discovering business navigation maps for analyzing data 123, where for example, a graphical representation of a value represented by one or more various business parameters 100, is shown. The one or more various business parameters 100, could be displayed, for example on at least one screen 125, which is connected to at least one computer 150, via at least one first connection 151. The at least one first connection 151, could be selected from a group comprising, an electrical connection 151, a Wi-Fi network connection 151, a wired network connection 151, a wireless network connection 151, and combinations thereof, to name a few. The at least one computer 150, is preferably connected via at least one second connection 171, to at least one database 165, and at least one storage device 175. The at least one second connection 171, could be selected from a group comprising, an electrical connection 171, a Wi-Fi network connection 171, a wired network connection 171, a wireless network connection 171, and combinations thereof, to name a few. Furthermore, the one or more various parameters 100, could be, for example, displaying one or more business report 110, for example, if the business report 110, is displaying material spent for different quarters, then a user 105, can click on a specific quarter to use the selected quarter as a parameter for all subsequent business navigation map reports for business report 110. As a further example, in FIG. 1, the user 105, can click on the dial gauge value parameter 115, for example, for a specific "Reschedule in" exception for all subsequent business navigation map reports 110, regarding this parameter 115. The business report 110, here as an example is a "Current Pull In Request", is illustrated. The exemplary purchase order rescheduling exception is shown as a dial gauge value parameter 115, although any form of graphical representation 115, may be used. Here, the dial gauge value parameter 115, points to a data point 120, where current purchase orders causing the order reschedule exception are greater than, for example, 16.25M. This number is exemplary in nature and any quantity could be set as the bar for taking exception to a set practice rule. If multiple values are selected as measurements for implementing an exception, this may be depicted or accomplished by a different visual, including but not limited to a bar chart or a table with multiple values visible simultaneously and options for the user 105, to make selections for one or more values. In another embodiment, the graphical representation 115, may display, for example, a business parameter 100, such as, for example, material spent for different quarters of the year. In this example, the user 105, can click on a specific quarter to use the selected quarter as a business parameter 100, for all subsequent business navigation map reports 110. The screen 125, could have other business parameters 100, that a user 105, could select from, such as, for example, change visualization 121, show table 127, show table and chart 129, to name a few. It should be appreciated that one or more various business parameters 100, and the one or more business reports 110, reside at a database 165, and/or on a storage device 175, and it can be readily accessed by a user 105, on at least one screen 125, via at least one computer 150. The at least one computer 150, has at least one first logic processing module that is programmed to associate at least one data point of interest with at least one business report 110. It should be understood and appreciated that the computer 150, database 165, storage device 175, could be one unit or could be separate units which are internally or externally in communication with each other. Similarly, a host of programs, modules, logic devices, logic processors, etc., to name a few, which are well known in the art are also associated with, and in communication with, the computer 150, database 165, and/or storage device 175.

Figure 2:
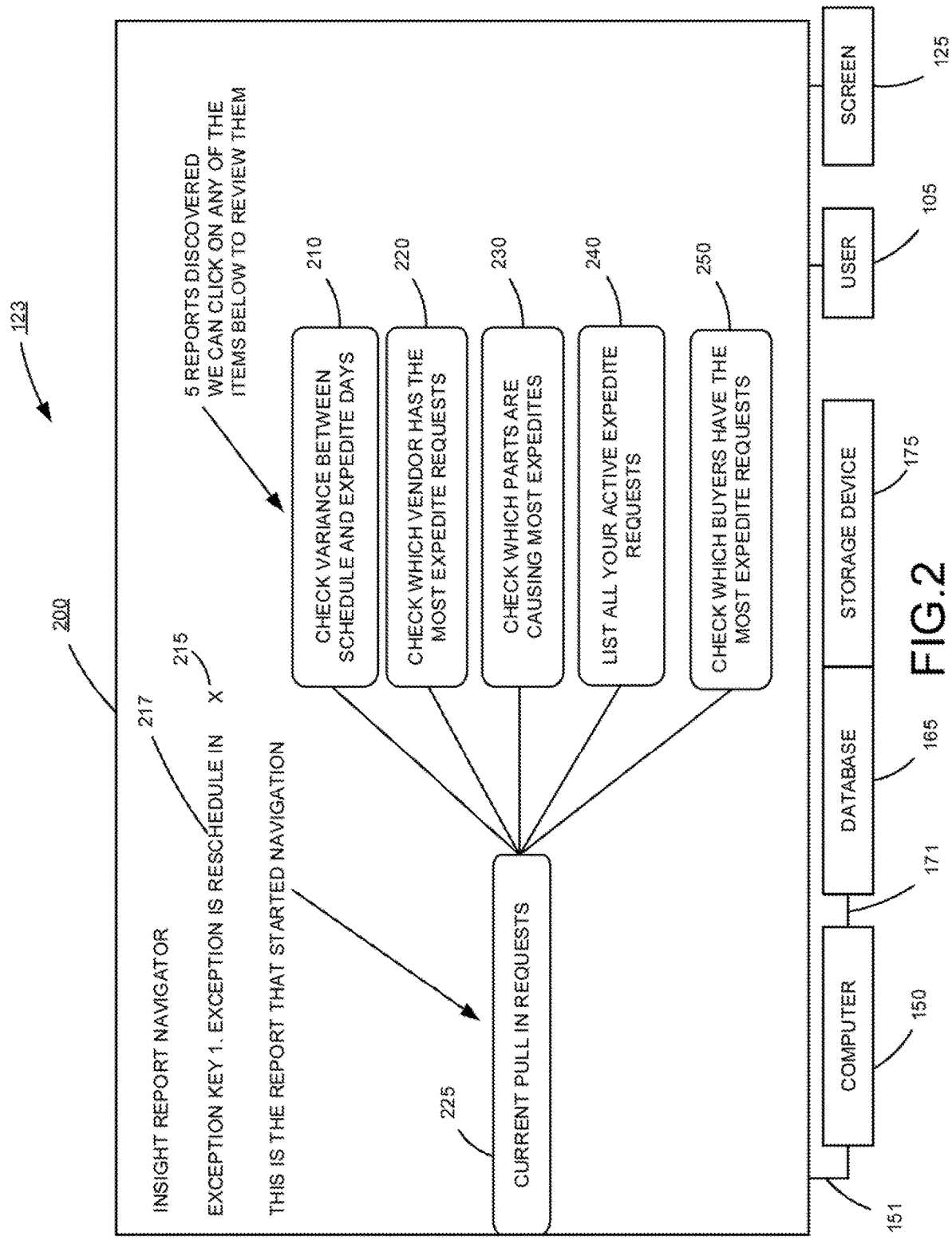
FIG. 2 illustrates a flow for navigation in accordance with an embodiment of the present invention.

FIG. 2 illustrates an embodiment of an exception 200, for the inventive system, method, and apparatus for creating, linking, and discovering business navigation maps for analyzing data 123. As depicted here, for example, the type of exception 215, for example, Reschedule In X 217, is shown. As a value of the graphical representation, "Reschedule In" as used in FIG. 1, presents a drill-down/drill through search functionality linking dynamic or static business reports 110, consisting of one or more data points in one embodiment, different filters of data points can further enhance the dynamic or static reports linked. In another embodiment, each dynamic or static business report, here one to five or $n^{th}$ business reports are shown 210, 220, 230, 240, 250, that are linked to the parent graphical representation data report 110, in this example "Current Pull In Requests" 225. By clicking on the parent business report 110/225, a navigation map is activated. In one embodiment, pre-existing data reports may be automatically generated by the computer 150, and linked to the parent data point report based on different parameters including, but not limited to, user 105, selected business reports 110, such as, for example, statically linked reports, most used report history, most voted report by users, most relevant search report, past user experience, etc., to name a few. Thus, this invention allows for the improvement to the computer-related technology, an improvement to the functioning of the computer itself, and the improvement to the computer performance, by providing the search results in an efficient manner, and with a faster search response times, which also allows for the use of a smaller memory. And, faster access to these business reports increases the overall speed of the program. The pre-existing business data reports 110, may be removed or additional business reports 110, may be added or linked to any business report 110, including those visible on the navigation map 123. Embodiments of the present invention 123, permit full and unfettered discretion on the part of the user 105, to create, add or subtract any business data report 110, and associate it with any existing business data report 110, whether relevant or irrelevant. The business reports 110, 210, 220, 230, 240, 250, provide additional data, although depicted as five reports, the number of reports depicted is not intended to be a limitation on the embodiments of the present invention and fewer reports or more reports are contemplated within the scope of the embodiments. In one embodiment of the present invention 123, the navigation of the business report 110, is shown using a tree with nodes and branches graphical representation. Thus, in the exception 200, the user 105, has requested on the screen 125, the current pull-in request 225, which is the business report 110, that started the navigation, and where the system or computer 150, discovered or compiled 5 reports or 1 through $n^{th}$ report, namely, 210, 220, 230, 240, 250, in the database 165, or assembled it from the data base 165, and then displayed it on the screen 125, for the user 105. Thus, this invention allows for the improvement to the computer-related technology, an improvement to the functioning of the computer itself, and the improvement to the computer performance, by providing the search results in an efficient manner, and with a faster search response times, which also allows for the use of a smaller memory. And, faster access to these business reports increases the overall speed of the program.

Figure 3:
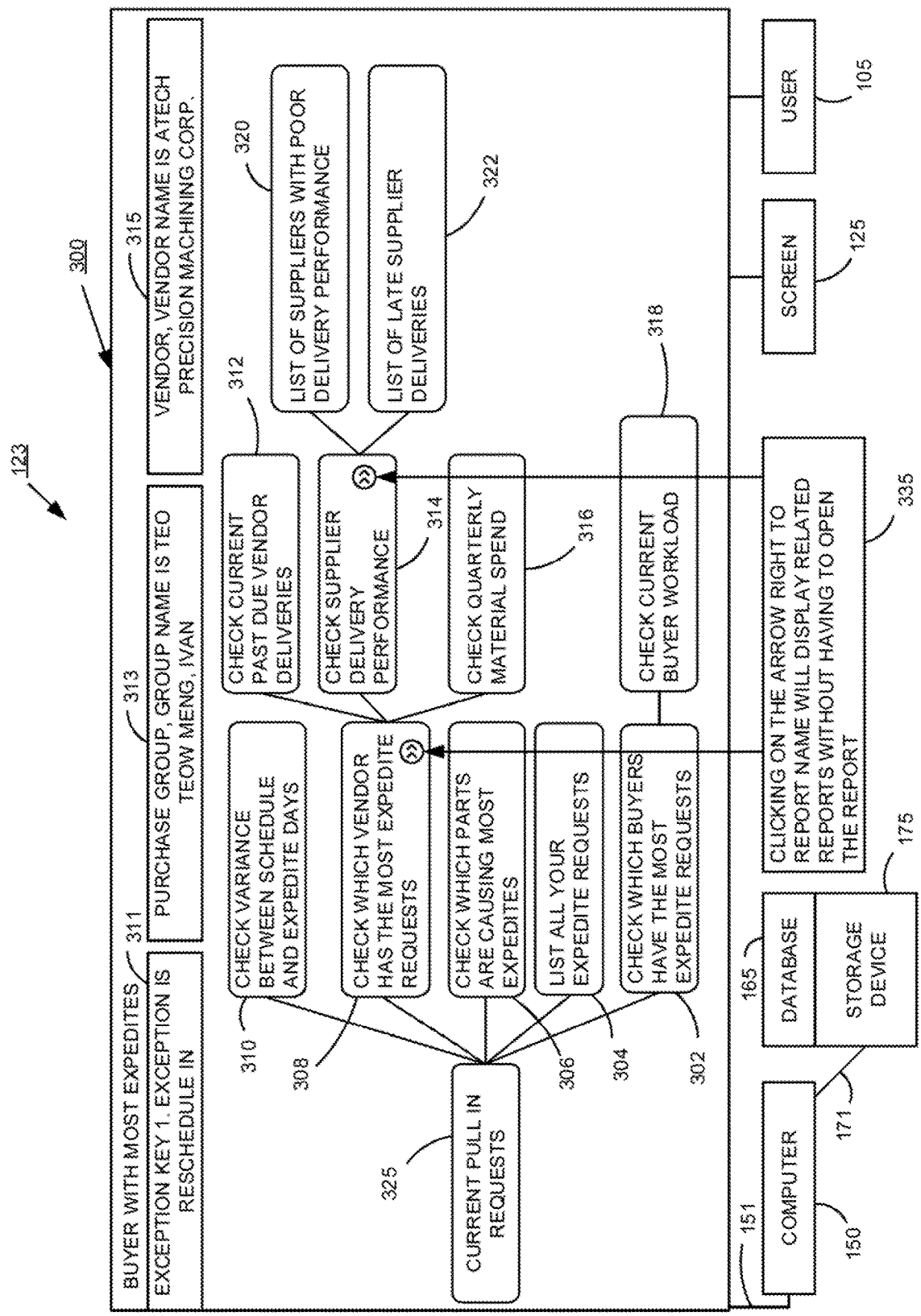
FIG. 3 illustrates a flow for dynamic or static linking in accordance with an embodiment of the present invention.

FIG. 3 illustrates an embodiment of the present invention 123, where, each data report or business report 110, is further linked dynamically or statically to further reports 110, consisting of one or more data points 300. The system 123, comprising one or more data points 300, illustrates an exemplary drill-down/drill through search functionality of this invention. The system 123, comprising one or more data points 300, expands recursively using, for example, a graph model, although any form of graphical representation may be used, where each business report or node 225, can link to one or more child business report or nodes 210, 220, . . . , 250. Child business reports 210, 220, . . . , 250, for the graphs can be added explicitly by user 105, or automatically by the system 123, based on different parameters including, but not limited to, most used report history, most voted report by users, most relevant search report, etc., to name a few. In FIG. 3, child business reports 302, 304, 306, 308, . . . , 310, of the parent business reports 325, are used to further build an exemplary graphical "tree" for the navigation map 123. Each child business report 302, 304, . . . , 310, may or may not be based on the same logic as the parent business report 325, 225, 110. This model of recursively linking business reports enables a dynamic graph which is then available for the user 105, to navigate. In one embodiment, this process continues till all business reports are expanded 312, 314, 316, 318, 320, 322, and there are no further children business reports. Child business report expansion 302, 304, . . . , 322, can be automatic or manually by a user 105, by clicking on the expand icon for the parent business report or taking some other action. As shown in FIG. 3, is a "Current Pull-In Request" or business report 325, for a "Buyer With Most Expedites" 300, or one or more data points 300, which can further have tabs or buttons 311, 313, . . . , 315, for further expansion of the business report 110, 225, 325, fields, which are also referred to as child or children business reports. Furthermore, within the system 123, at each business report or child business report one can also have tabs or buttons or fields or links 335, which would allow a user 105, to for example, click on it to obtain, for example, business report name, related business reports, and this could be done without actually having to open that particular business report. As the number of reports or data to be analyzed increases exponentially, this invention allows for the access of needed reports in an efficient, and quick manner, instead of clogging down the capacity or memory of the computer or the data base.

Figure 4:
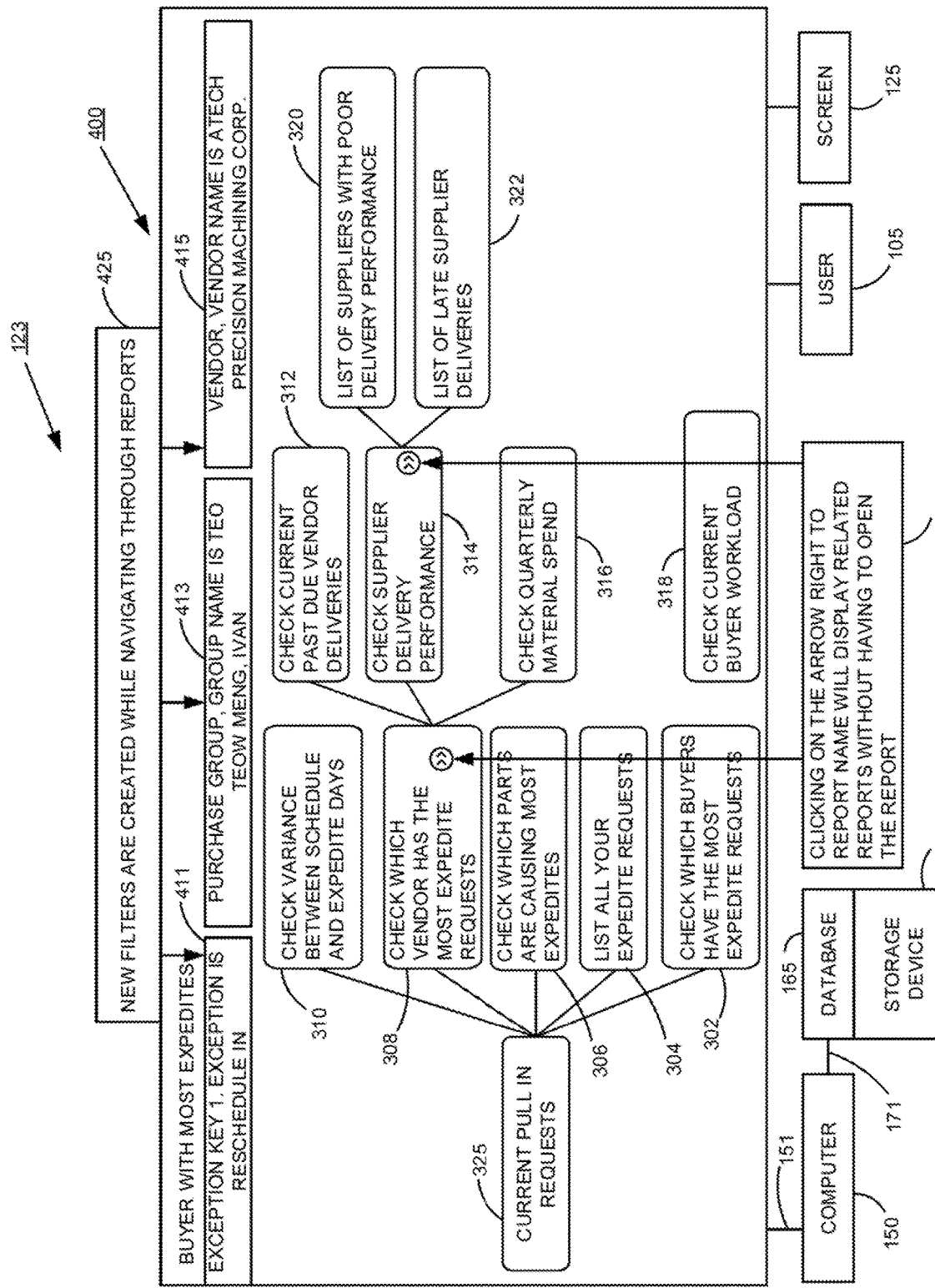
FIG. 4 further illustrates a method for the creation of new filters in accordance with an embodiment of the present invention.

FIG. 4 illustrates the system of FIG. 3 further expanding recursively the child business reports 302, 304, . . . , 322, of the parent business reports 110, 225, 325, to further build out the graphical representation of a navigation tree or navigation map for each child business report 210, 220, . . . , 322. In this embodiment 400, new filters 425, such as tabs, buttons, fields, 411, 413, . . . , 415, represent the data points selected during navigation between different business reports can be utilized to further drill-down/drill through the search functionality of this invention. In another embodiment, data point filters 425, further enhance the business reports 110, 225, . . . , 325, linked via the parent-child relationship 210, 220, . . . , 322.

In another embodiment, the present invention provides a method to record user navigation within the tree including all business report selections, selected dimension variables, last position of user navigation within navigation tree, etc. This may be accomplished by the system building the list of user selections which are then passed to the other business reports to filter the data based on the previous selections. The process of remembering the user selections at each interaction will generate a dynamic selection list at the runtime based on user navigation between different business reports and will be instrumental for root-cause analysis for a specific scenario even for large data volumes. In another embodiment, aspects of the present invention permit the dimension attributed values selected during navigation to other business reports within the tree navigation.

Figure 5:
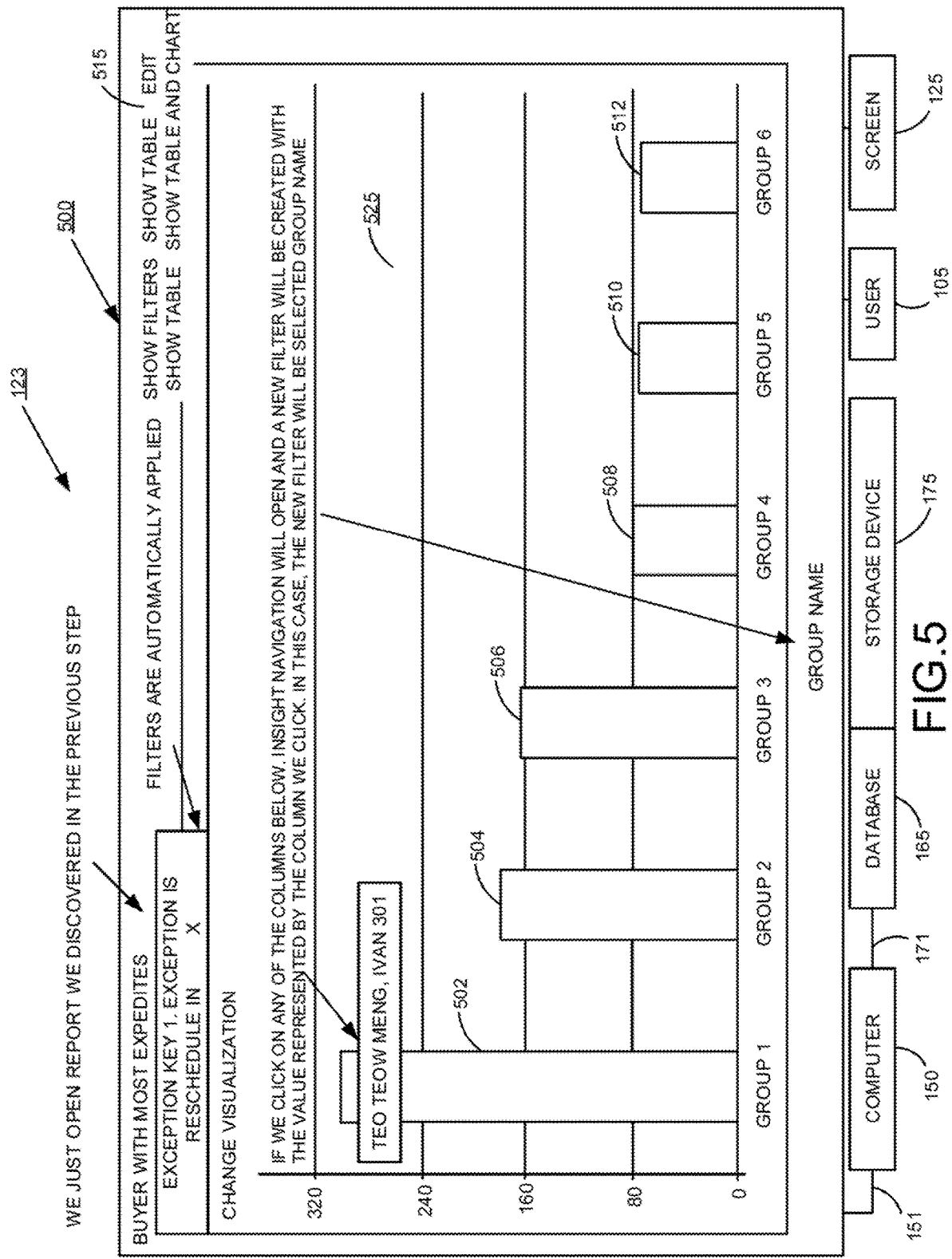
FIG. 5 illustrates an example of the dynamic use of data point filters in accordance with an embodiment of the present invention.

FIG. 5 illustrates an embodiment of the present invention, depicting the dynamic use of data point filters 500. As an example, data point filters 500, may be used to track the different data points selected to arrive at the current level of business reports. As a further example, data point filters 500, permit the user 105, to determine what data point filters 500, were used to arrive at the current business report. In the embodiment depicted, a business report or bar graph 525, is categorized into multiple groups 502, 504, 506, 508, 510, . . . , 512, based on the business report data generated after applying the filter 500, that was selected in the previous report. Now instead of displaying all the expedite exceptions, only rescheduling exceptions 502, 504, 506, 508, 510, . . . , 512, are visible because of the active filter "Rescheduling In." 511. One can also have one or more other filters 515. Furthermore, for example, as shown in FIG. 5, one can also have a further drill-down/drill through the search functionality of this invention 123, by using for example, a group name 535, that generated business report or bar graph 525, where individual or child business report 502, 504, . . . , 512, could be further expanded by for example, clicking on the column or bar graph 502, and the Insight Navigation or invention 123, would open and a new filter would be created with the value represented by the column or graph 502, that was clicked by the user 105, and furthermore the new filter would be within the selected group name 535.

Figure 6:
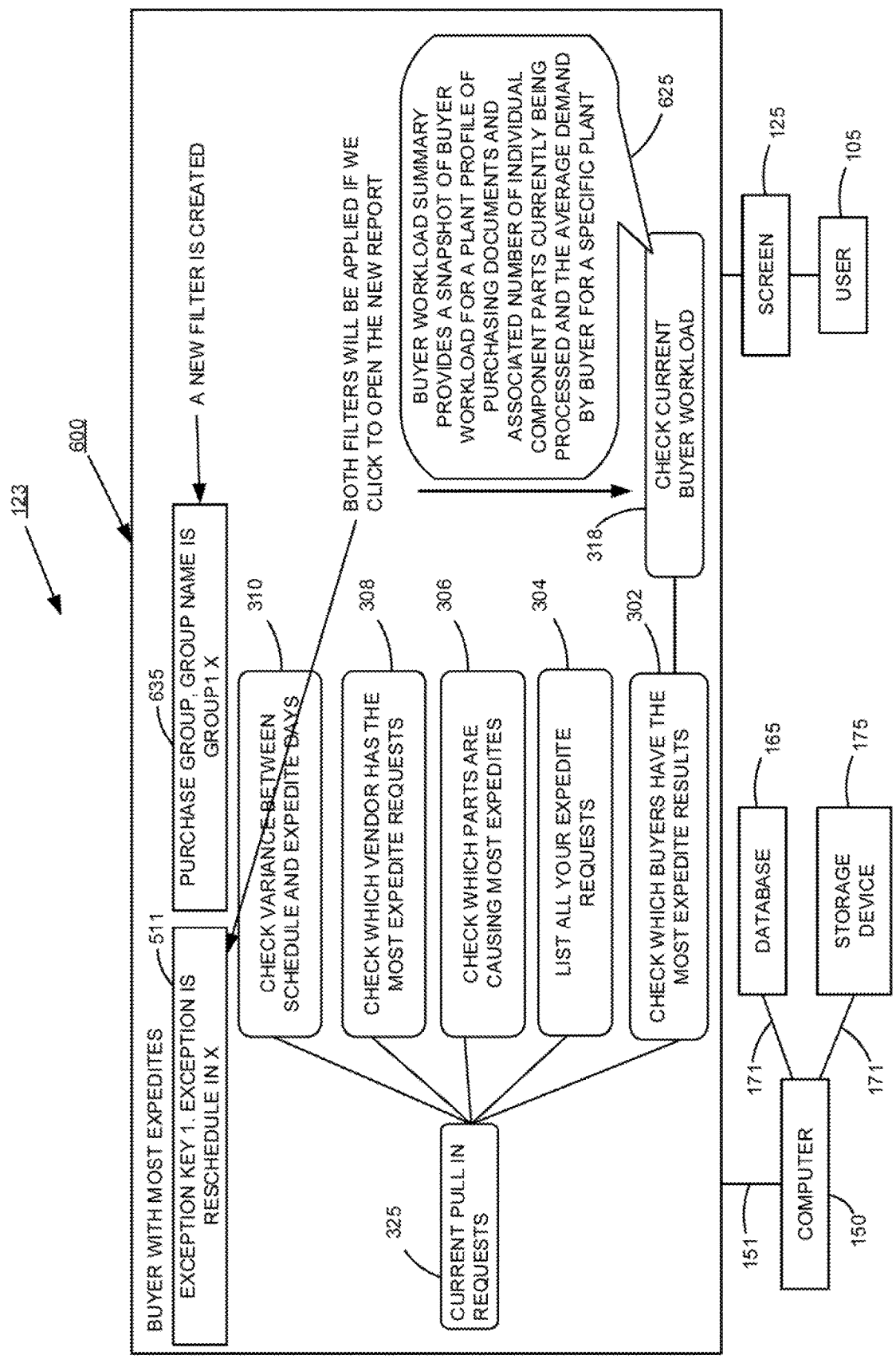
FIG. 6 illustrates an example of the dynamic use of data point filters in accordance with an embodiment of the present invention.

FIG. 6 illustrates an embodiment of the present invention 123, depicting the dynamic use of data point filters 600. Exemplary aspects provide a system, method, and apparatus 123, to save a navigation tree and then open it as needed. Exemplary aspects of embodiments of the present invention 123, include a system that permits users 105, to link business reports 110, as children to any business report 110. FIG. 6 illustrates how filters will be applied when any report is selected within the navigation map. Embodiments may include navigation features, chatting features, SMS features, and any other useful features known to those practicing in the art. For example, as shown in FIG. 6, one could select child report 625, such as, for example, "Buyer Workload Summary" 625, and where filter for the child report 318, and the filter 511, for the exception 511, would dynamically be applied to generate child report 625. Similarly, one can have additional new filters 635, which can also be used to further drill-down/drill through the search functionality of this invention 123.

Figure 7:
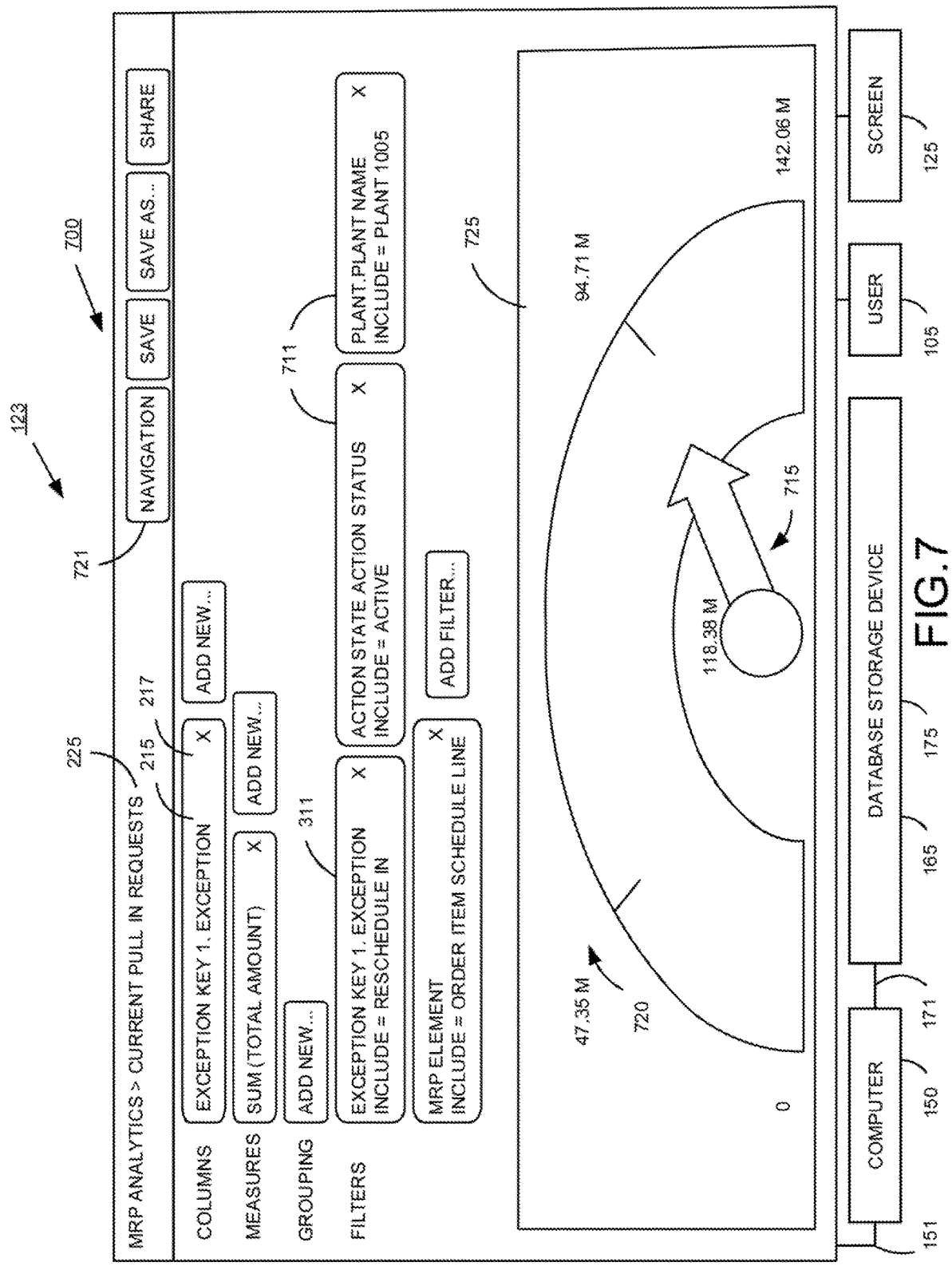
FIG. 7 illustrates a navigation feature for the dynamic use of data point filters in accordance with an embodiment of the present invention.

FIG. 7 illustrates an exemplary embodiment of the present invention 123, further illustrating a navigation feature for the dynamic use of data point filters 700, where a previously created navigation map is linked to any business report 110, 225, . . . , 625, and then stored 175, as part of the business report in a database 165. Once the navigation map is linked to a business report 110, 225, . . . , 625, the user 105, will be able to activate the linked navigation map whenever the business report 110, 225, . . . , 625, is displayed in the application. As shown in FIG. 7, the dynamic use of data point filters 700, have generated a business report 725, where the user 105, can click on the dial gauge value parameter 715, for example, for a specific business report 725, here, for example, the dial gauge value parameter 715, points to a data point 720, where the "Current Pull In Requests" 225, is shown, for example, around about 94.71M, and it should have been around, for example, 118.38M, or for example, the actual or projected number is 118.38M. These numbers is exemplary in nature and any quantity could be set as the bar for taking exception to a set practice rule. If multiple values are selected as measurements for implementing an exception, this may be depicted or accomplished by a different visual, including but not limited to a bar chart or a table with multiple values visible simultaneously and options for the user 105, to make selections for one or more values. One can also have one or more additional business filters 711, and one or more navigational tabs or buttons 721.

Figure 8:
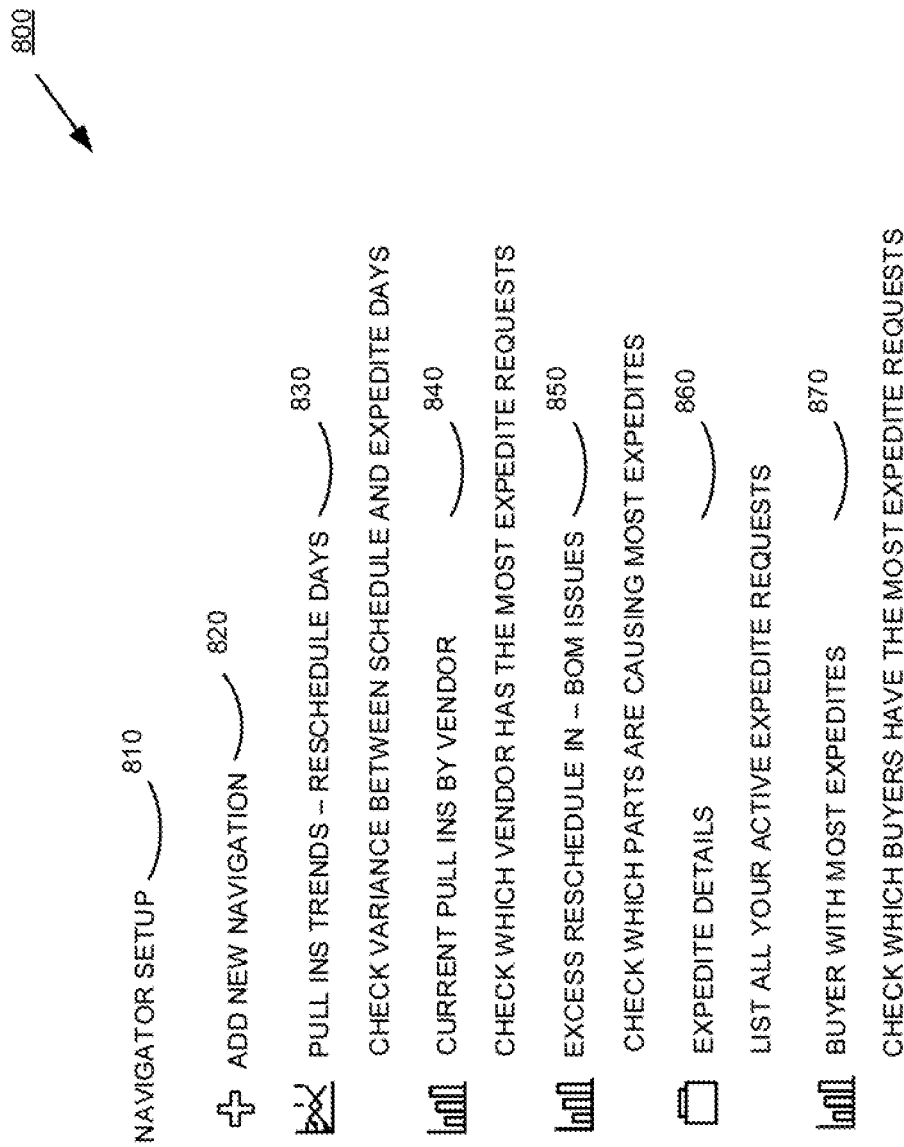
FIG. 8 illustrates a navigation feature in accordance with an embodiment of the present invention.

FIG. 8 illustrates an embodiment of a navigation feature 800, that enables the linking and sharing of any business report to other business reports based on different parameters and data points, including but not limited to user role, subject area, previously viewed business reports, most liked business reports, business reports in user network, etc., to name a few. There may be any number of business reports 110, 225, . . . , 725, that link to each other based on any number of data points. The navigation feature 800, may operate to query a user 105, to cause the user 105, to further evaluate where relationships might or should be created, it may also suggest relations, and prepopulate such. For example, as shown in FIG. 8, the navigation feature 800, has a navigator setup 810, and which further allows for adding new navigation features 820. The screen 125, is showing the user 105, business features 830, 840, 850, 860, . . . , 870, which the user 105, can use to further drill-down/drill through using the search functionality of this invention 123.

Figure 9:
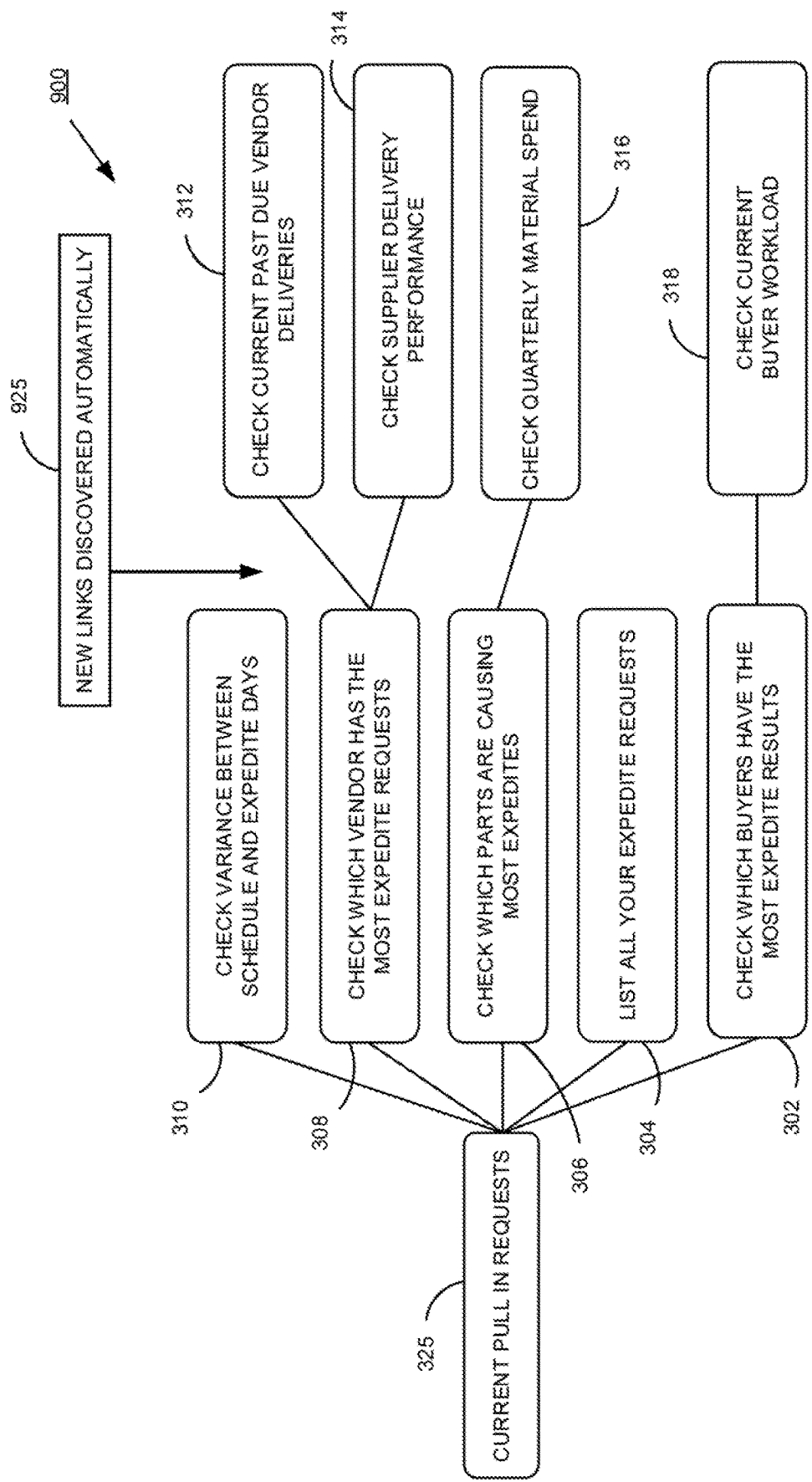
FIG. 9 illustrates automatic linking of reports in accordance with an embodiment of the present invention.

FIG. 9 illustrates the automatic or dynamic linking of business reports 900. The automatic or dynamic linking 900, provides for linking, without user 105, intervention based on a specified parameter, including but not limited to, similar data points, most used report history, most voted report by users, most relevant search report, past user experience, etc., to name a few, as described in conjunction with FIG. 3 above. This provides a system, method, and apparatus 123, that enables users 105, to search the previously created business navigation maps and load such business maps for viewing by displaying the relevant navigation business maps based on the search criteria; which allows for the improvement to the computer-related technology, an improvement to the functioning of the computer itself, and the improvement to the computer performance, by providing the search results in an efficient manner, and with a faster search response times, which also allows for the use of a smaller memory; and, a faster access to these business navigation maps increases the overall speed of the program; enabling users 105, to add business navigation maps to the dashboard similar to adding a business report by providing a way to select a previously created business navigation map and a mechanism to select one or more business navigation maps from the list of navigation maps. In one embodiment, users 105, may suggest existing business navigation maps to other users 105, based on the business reports they are accessing and using by providing a way to suggest a navigation map to another user 105, by similar functions including, but not limited to, bookmarking, emailing or adding a navigation mark to the favorite list. It also enables a way to notify users 105, of new business navigation maps created by others by enabling sharing of navigation maps between users 105. This can be automated without user 105, intervention or manually by a user 105, requesting such or being sent such. Here the automatic or dynamic linking of business reports 900, has automatically discovered or generated a new link 925, for the user 105, to explore or further drill-down/drill through using the search functionality of this invention 123.

Figure 10:
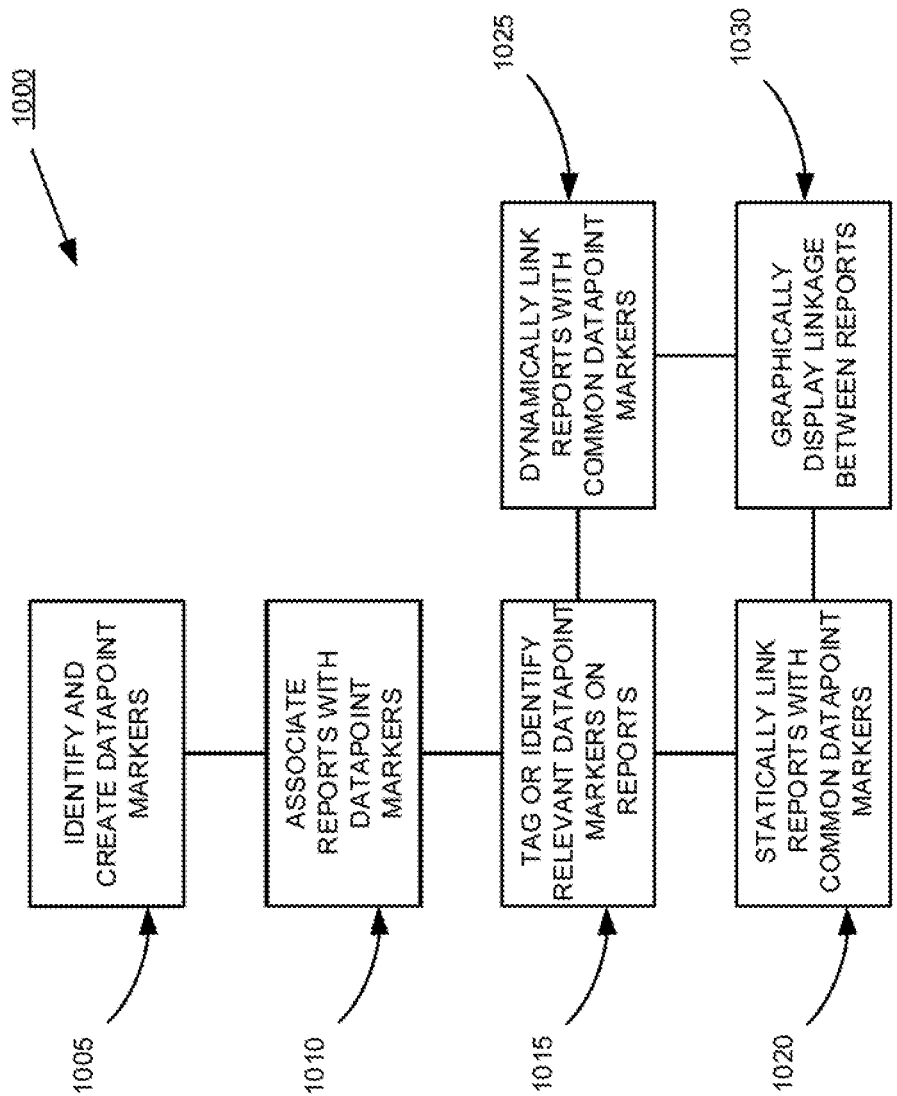
FIG. 10 illustrates a logical flow diagram depicting a method for dynamic mapping in accordance with an embodiment of the present invention.

FIG. 10 illustrates a method 1000, for creating navigation maps to allow a user 105, to navigate through related or unrelated business reports 110, 225, . . . , 725. Although depicted in a flow chart, the order of the steps in the present embodiment is exemplary and is not intended to be a limitation on the embodiments of the present invention. It is contemplated that the present invention includes the process being practiced in other orders and/or with intermediary steps and/or processes. In exemplary step 1005, data point markers may be identified and created. Data point markers may be any category, subcategory, class, subclass, grouping, or division of or scenario of data or data points that can be thought of. In exemplary step 1010, reports may be associated with the data point markers. Further, although not shown, new business reports may be created and associated, as well as existing business reports, or future business reports with data point markers. In exemplary step 1015, data point markers relevant to the business report are tagged or identified using predefined criteria. In exemplary steps 1020, and 1025, business reports with common data point markers may be statically linked or dynamically linked. In one embodiment, static linkage may be accomplished by the user 105, manually linking various business reports that have common data point markers. In another embodiment, dynamic linkage may be accomplished by using software or link management software. In exemplary step 1030, linkages between various business reports are graphically displayed. Further, although not shown, it is also contemplated that the graphical display step 1030, may contain business reports that are dynamically and statically linked with other business reports.

Figure 11:
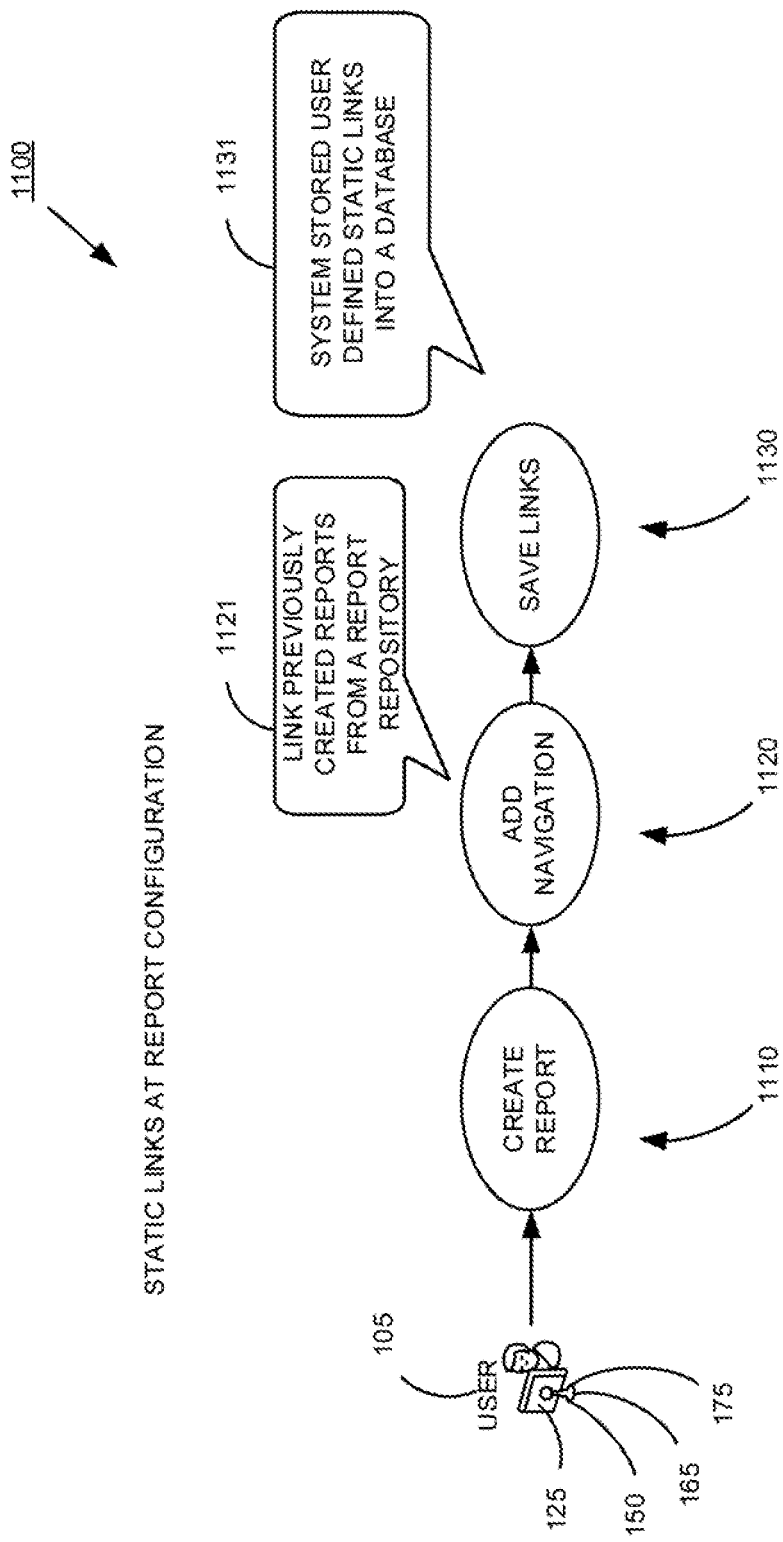
FIG. 11 illustrates a simplified logical flow diagram depicting a method for static linking in accordance with an embodiment of the present invention.

FIG. 11 illustrates a method 1100, for creating static links for business report configurations. The method 1100, may be performed by a user 105, may be automated or may be a combination of automation and manual user input. The orders of the steps in the present embodiment are exemplary and are not intended to be a limitation on the embodiments of the present invention. It is contemplated that the present invention includes the process being practiced in other orders and/or with intermediary steps and/or processes. A user 105, creates a business report 1110. The user 105, builds a business navigation tree or business navigation map 1120. The user's 105, business navigation tree is linked to previously created business reports from a repository 1121, such as, a data base 165, or a storage device 175, which is accessible via a computer 150. The business navigation tree, and business reports are finally saved and stored 1131, in a database 165, 1130. This database 165, 1130, may be recalled and used as existing or modified for other business purposes. It should be understood that the database 165, 1130, may be the same or may be different data bases.

Figure 12:
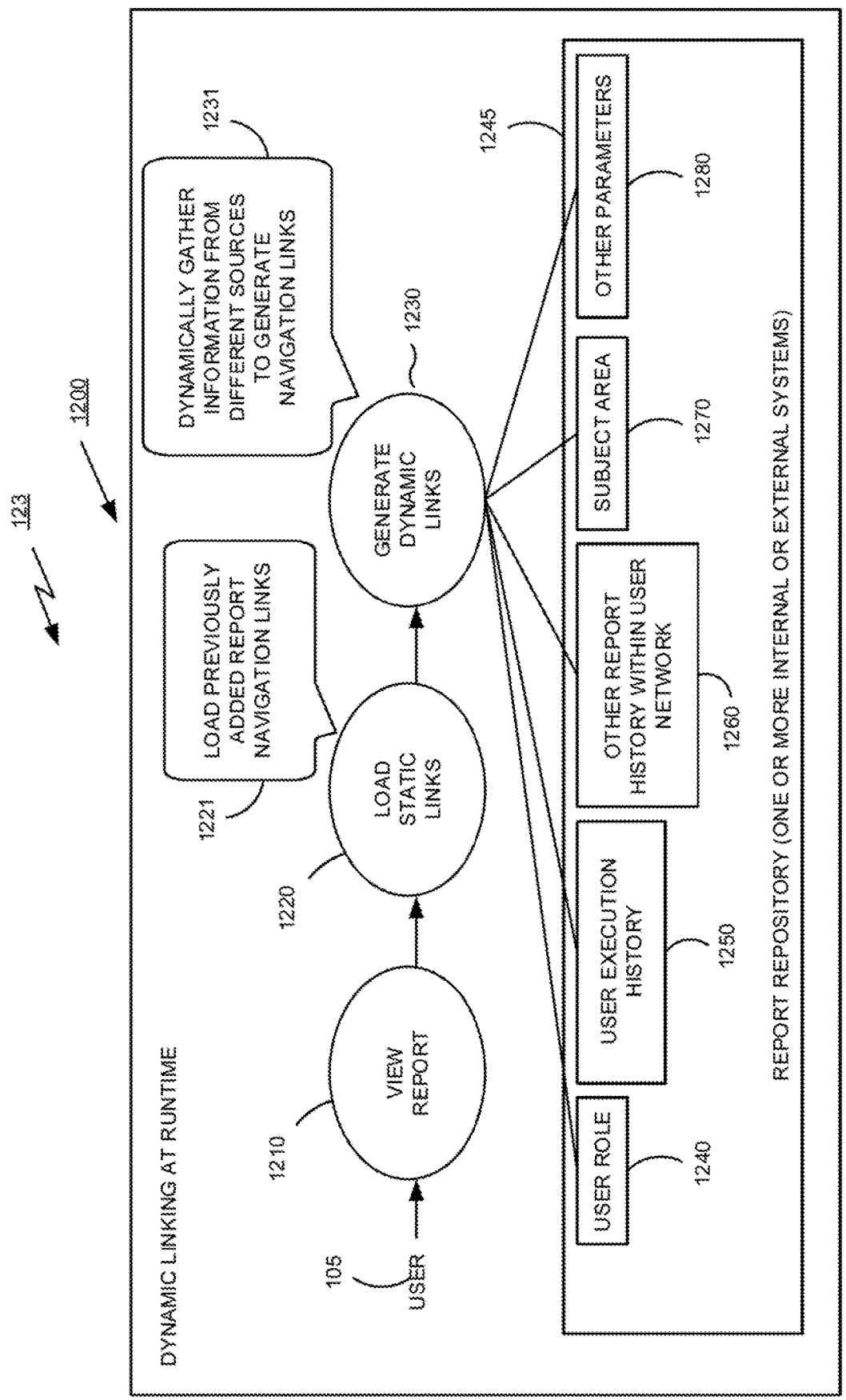
FIG. 12 illustrates a simplified logical flow diagram depicting a method for dynamic linking in accordance with an embodiment of the present invention.

FIG. 12 illustrates a method 1200, for dynamic linking. The orders of the steps in the present embodiment are exemplary and are not intended to be a limitation on the embodiments of the present invention 123. It is contemplated that the present invention 123, includes the process being practiced in other orders and/or with intermediary steps and/or processes. A user 105, may view a business report 1210. Subsequently, a navigation tree or navigation map is loaded. The navigation tree or navigation map may or may not have previously added business reports 1220. For example, the business reports 1220, could load static links 1220, such as, for example, load previously added business report navigation links 1221. In an exemplary step information from different sources, including but not limited to the business report repository, which may include any number of business reports 110, 225, . . . , 725, based on any number of data points that may be changing or updating regularly or intermittently, are gathered to create navigation links 1230. Additionally, for example, navigation links 1230, could be, for example, dynamic links 1230, that dynamically gather information from different sources to generate navigation links 1231, for the navigation links 1230. Additionally, the business navigation links 1230, could be expanded or explored to one or more business report repository 1245, having one or more drill-down/drill through tabs or fields 1240, 1250, 1260, 1270, . . . , 1280, which could be used by the user 105, to further explore or further drill-down/drill through using the search functionality of this invention 123.

Figure 13:
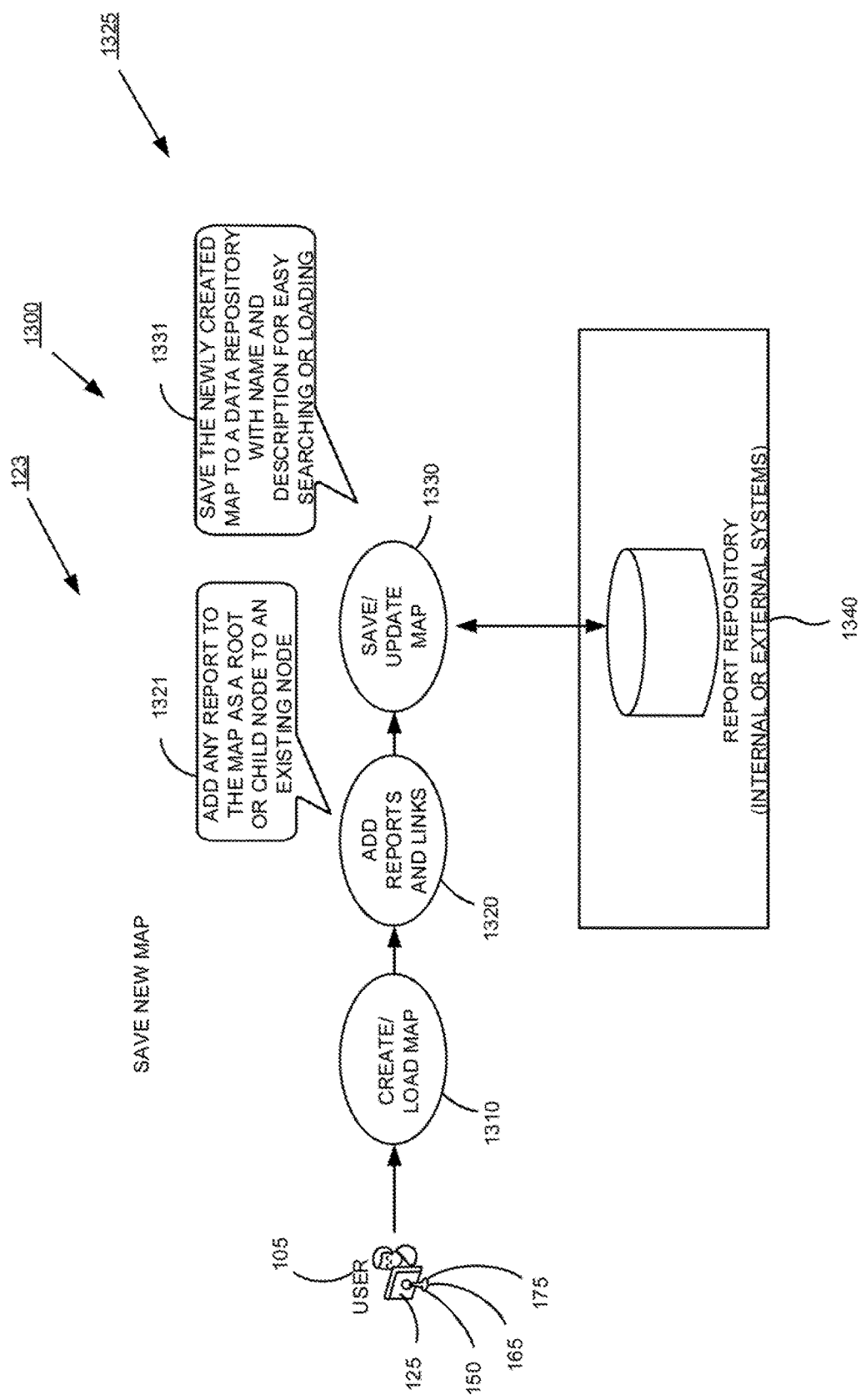
FIG. 13 illustrates a simplified logical flow diagram of a method for saving a new map in accordance with an embodiment of the present invention.

FIG. 13 illustrates a method 1300, for creating and saving a business map 1325. The orders of the steps are exemplary and are not intended to be a limitation on the embodiments of the present invention. It is contemplated that the present invention includes the process being practiced in other orders and/or with intermediary steps and/or processes. A user 105, creates or loads a previously created business map 1310. Alternatively a business navigation map 1310, can also be created automatically based on other dynamic methods discussed above. Business reports and links may be added to the business map 1320, by the user 105, or through an automated process, in addition the business map 1320, could be created from the reports and links 1321. The business map 1320, is then saved, and updated 1330, when appropriate, again either by a user 105, or through an automated process. The business maps 1310, 1320, . . . , 1330, as well as business reports and links 1321, may be stored in a database 165, 1340, a repository 165, 1340, or any other internal or external system 165, 1340, that is capable of maintaining data 165, 1340. Thus, this invention allows for the improvement to the computer-related technology, an improvement to the functioning of the computer itself, and the improvement to the computer performance, by providing the search results in an efficient manner, and with a faster search response times, which also allows for the use of a smaller memory. And, faster access to these business maps, business reports, business links, increases the overall speed of the program. Optionally, the system 1300, or the user 105, could automatically or manually save the newly created business map 1325, to a data repository 165, 1340, with, for example, name, description, etc., for easy searching or loading 1331, for subsequent accessibility to the user 105. It should be understood that the database 165, 1340, may be the same or may be different data bases.

Figure 14:
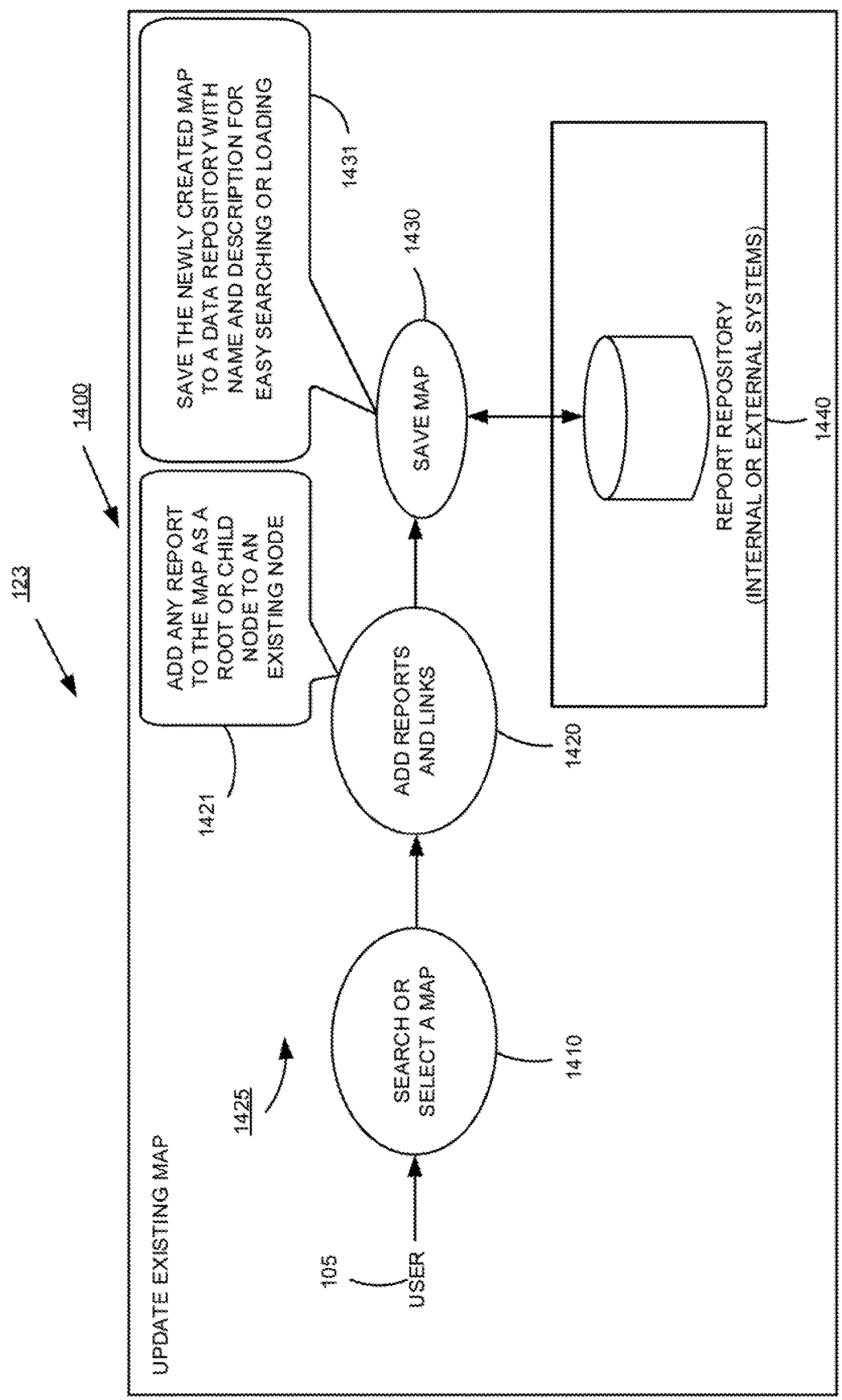
FIG. 14 illustrates a simplified logical flow diagram of a method for updating an existing map in accordance with an embodiment of the present invention.

FIG. 14 illustrates a method for updating an existing business map 1400, such as a business map 1325, created in conjunction with FIG. 13 above, so as to have an updated existing business map 1425. The method 1400, may be performed by a user 105, may be automated or may be a combination of automation and manual user input. The orders of the steps in the present embodiment are exemplary and are not intended to be a limitation on the embodiments of the present invention. It is contemplated that the present invention includes the process being practiced in other orders and/or with intermediary steps and/or processes. The business map 1425, is located either through a search or selected by title 1410. The business map 1425, is then updated 1420, by adding links or business reports or any other appropriate data 1421. The business map 1425, is saved, and updated 1430. The business map 1425, as well as business reports and links may be stored in a database 165, 1440, a repository 165, 1440, or any other internal or external system that is capable of maintaining data 165, 1440. Optionally, the system 1400, or the user 105, could automatically or manually save the newly created/updated business map 1425, to a data repository 165, 1440, with, for example, name, description, etc., for easy searching or loading 1431, for subsequent accessibility to the user 105. Thus, this invention allows for the improvement to the computer-related technology, an improvement to the functioning of the computer itself, and the improvement to the computer performance, by providing the search results in an efficient manner, and with a faster search response times, which also allows for the use of a smaller memory. And, faster access to these business reports, business maps, links, data, increases the overall speed of the program. It should be understood that the database 165, 1440, may be the same or may be different data bases.

The inventive system, method, and apparatus for creating, linking, and discovering business navigation maps for analyzing data 123, further comprises of creating business navigation map, comprising, at least one computer 150, in electrical connection 171, with at least one database 165, 1130, 1340, 1440, and at least one storage device 175, 1130, 1340, 1440. The at least one computer 150, is in communication with at least one processor and at least one host module 165/175, and wherein the at least one host module 165/175, being adapted to receive data point markers about at least one data point of interest from at least one user 105, the at least one host module 165/175, further includes a data input link for receiving information about the at least one data point of interest; a first logic processing module in communication with the at least one computer 150, and programmed to associate at least one data point of interest with at least one business report 110, wherein the first logic processing module uses at least one predefined criteria to tag the at least one data point of interest as relevant to the at least one business report 110. At least one database module 165/175, in communication with the at least one computer 150, and being adapted to store and obtain the at least one data point of interest, data point marker, and the at least one business report 110.

The inventive system, method, and apparatus for creating, linking, and discovering business navigation maps for analyzing data 123, further comprises a method for navigating through business reports 110, comprising, at least one computer 150, in electrical connection 151, with at least one database 165, 1130, 1340, 1440, and at least one storage device 175, 1130, 1340, 1440, the at least one computer 150, is in communication with at least one processor and at least one host module 165/175, and adapting the at least one host module 165/175, to receive data point markers about at least one data point of interest from a user 105, using the at least one computer 150, and providing a data input link for receiving information about the at least one data point of interest; associating the at least one data point of interest with at least one business report 110, by adapting at least one logic processing module using predefined criteria to tag the at least one data point of interest as relevant to the at least one business report 110. At least one database module 165/175, is in communication with the at least one computer 150, and accessing the at least one database module 165/175, to store and obtain the at least one data point of interest, at least one data point marker, and the at least one business report 110. Thus, this invention allows for the improvement to the computer-related technology, an improvement to the functioning of the computer itself, and the improvement to the computer performance, by providing the search results in an efficient manner, and with a faster search response times, which also allows for the use of a smaller memory. And, faster access to these business reports, data, links, maps, data point of interest, data point marker, increases the overall speed of the program.

In accordance with an embodiment of the present invention, a method provides a way for users to navigate information in the form of a visually displayed navigation tree. In one embodiment, the navigation tree is built dynamically when, for example, a user clicks on the graph, table, or any other form of organization of data. In another embodiment, the tree parent and children nodes may be determined based on what is clicked and what information is relevant for that report. Similar to a map, in one embodiment, a navigation tree will visually display the current location of user navigation within the tree.

In another embodiment, the navigation tree is built statically by the user, enabling the user to link the current report to any other report the user deems relevant. The static linkage may be based on any number of data points within the present report and the reports being linked, and any other criteria deemed relevant by the user, such as, for example, practice area, scope of relevance, organizational structure, etc.

In yet another embodiment the method provides for users to build new navigation map-like reports. For example, instead of just providing a single report in a dashboard, the system enables a way to display a navigation map to users that will make it very easy for them to analyze data without having to figure out the correct sequence of report navigation to determine the root cause of an issue or a trend.

In another embodiment, the system presents a drill-down/drill through search functionality in a form of, for example, a tree with nodes and branches. When a user clicks on a report, a tree is built dynamically with link nodes representing dynamically or statically link reports that are relevant to the current report. It is asserted that the "tree with nodes and branches" is an exemplary embodiment of the present invention. However, any form of graphical representation may be used, including but not limited to 2-D or 3-D format, to accomplish the desired result.

Aspects of the present invention may be implemented in various configurations. For example, in one embodiment the invention may be implemented as a desktop personal computer, stand-alone computer, workstation computer, mobile computer, portable computing device, personal digital assistant (PDA) device, cellular telephone, digital audio or video playback device, or any other similar type of computing device. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Aspects of the present invention may be implemented on one or more computers executing software instructions. According to one embodiment of the present invention, server and client computer systems transmit and receive data over a computer network or a fiber or copper-based telecommunications network. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention. The CPU may include one or more software modules, host modules, and logic processing modules.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the CPU may directly support the downloaded instructions. In other cases, the instructions may not be directly executable by the CPU, and may instead be executed by an interpreter that interprets the instructions. In other embodiments, hardwired circuitry may be used in place of, or in combination with, software instructions to implement the present invention. Thus the present invention is not limited to any specific combination of hardware circuitry and software, nor to any particular source for the instructions executed by the server or client computers. In some instances, the client and server functionality may be implemented on a single computer platform.

Aspects of the present invention can be used in a distributed electronic commerce application that includes a client/server network system that links one or more server computers to one or more client computers, as well as server computers to other server computers and client computers to other client computers. The client and server computers may be implemented as desktop personal computers, workstation computers, mobile computers, portable computing devices, personal digital assistant (PDA) devices, cellular telephones, digital audio or video playback devices, or any other similar type of computing device. The terms "computer network" and "online" may be used interchangeably and do not imply a particular network embodiment or topography. In general, any type of network (e.g., LAN, WAN, or Internet) may be used to implement the online or computer networked implementation of the system, method, device, and apparatus for creating, linking and discovering navigation maps for analyzing data.

Thus, the present invention is not limited to the embodiments described herein and the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

Furthermore, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An apparatus comprising: a computer, and a memory storing instructions, wherein the instructions are executed by the computer to perform a method comprising the steps of:
   (a) providing at least one computer in electrical connection with at least one database and at least one storage device, said at least one computer in communication with at least one processor and at least one host module,
(b) generating a business report of interest containing data points;
(c) providing from a user using said at least one computer predefined criteria for data point markers about at least one data point of interest and adapting said at least one host module to receive said data point markers about at least one data point of interest,
(d) said user providing a data input link for receiving information about said at least one data point of interest from other business reports containing data points stored in said at least one storage device, said data input link being either:
(e) a static link manually linking said business reports that have common data point markers, or
(f) a dynamic link automatically linking said business reports using that have common data point markers;
(g) establishing a criteria to efficiently determine whether said at least one data point of interest from said other business reports is contained within said at least one business report of interest, by adapting at least one first logic processing module in communication with said at least one computer and programmed to associate said at least one data point of interest with said at least one business report of interest using said predefined criteria,
(h) when said at least one data point of interest is contained within said at least one business report of interest, tagging said at least one data point of interest as relevant to said at least one business report of interest so as to provide a faster search for said user; and
(i) accessing said at least one database, to store and obtain said at least one data point of interest, at least one data point marker, and said at least one business report of interest, and wherein said instructions executed by said at least one computer using said steps to generate said at least one business report of interest is done in a manner which has a faster search response time, and it allows use of a smaller computer memory for the generation of said at least one business report of interest.

2. The apparatus of claim 1, wherein said at least one database has at least one means to notify said user of at least one new business navigation map created by another user by enabling sharing of said at least one new business navigation maps between users.

3. The apparatus of claim 1, wherein the data point marker is predefined.

4. The apparatus of claim 1, wherein the at least one business report is a new business report.

5. The apparatus of claim 1, wherein the at least one business report is an existing business report.

6. The apparatus of claim 1, wherein said at least one predefined criteria is relational.

7. The apparatus of claim 1, wherein said at least one predefined criteria is at least one manual input by said user.

8. The apparatus of claim 1, wherein said at least one predefined criteria is determined by a link management software, and wherein said link management software is in communication with said at least one computer.

9. The apparatus of claim 1, wherein said at least one first logic processing module further electronically links said at least one business report with at least one another business report.

10. The apparatus of claim 9, wherein said linking of said at least one business report with at least one another business report is dynamic.

11. The apparatus of claim 1, wherein said business navigational map created is a graphical representation.

12. A method for navigating through business reports, comprising the steps of:
(a) providing at least one computer in electrical connection with at least one database and at least one storage device, said at least one computer in communication with at least one processor and at least one host module,
(b) generating a business report of interest containing data points;
(c) providing from a user using said at least one computer predefined criteria for data point markers about at least one data point of interest and adapting said at least one host module to receive said data point markers about at least one data point of interest;
(d) providing by said user a data input link for receiving information about the at least one data point of interest from other business reports containing data points stored in said at least one storage device, said data input link being either:
(e) a static link manually linking said business reports that have common data point markers, or
(f) a dynamic link automatically linking said business reports using that have common data point markers;
(g) establishing a criteria to efficiently determine whether said at least one data point of interest from said other business reports is contained within said at least one business report of interest, by adapting at least one logic processing module using said predefined criteria;
(h) when said at least one data point of interest is contained within said at least one business report of interest, tagging the at least one data point of interest as relevant to the at least one business report of interest so as to provide a faster search for said user; and
(i) providing at least one database module, said at least one database module in communication with said at least one computer; and
(j) accessing said at least one database module to store and obtain the at least one data point of interest, at least one data point marker, and the at least one business report of interest, and wherein instructions executed by said at least one computer using said steps to generate said at least one business report of interest is done in a manner which has a faster search response time, and it allows use of a smaller computer memory for the generation of said at least one business report of interest.

13. The method of claim 12, comprising: creating at least one new data point marker; associating the at least one business report with the at least one new data point marker; identifying the at least one business report with relevant new data point markers: linking the at least one business reports with the common new data point marker; and displaying graphically the link between the at least one business reports with the common at least one new data point markers.

14. The method of claim 12, further comprising: creating at least one new data point marker; associating the at least one business report with the at least one new data point marker; identifying the at least one business report with relevant new data point markers; linking statically the at least one business reports with the common new data point marker; and displaying graphically the link between the at least one business reports with the common at least one new data point markers.

15. The method of claim 12, further comprising: creating at least one new data point marker; associating the at least one business report with the at least one new data point marker; identifying the at least one business report with relevant new data point markers; linking dynamically the at least one business reports with the common new data point marker; and displaying graphically the link between the at least one business reports with common at least one new data point markers.

16. The method of claim 12, further comprising: creating at least one new data point marker; associating at least one new business report with the at least one new data point marker; associating the at least one business report with the at least one new data point marker; identifying the at least one business report and the at least one new report with relevant new data point markers; linking the at least one report and the at least one new business report with the common new data point maker; and displaying graphically the link between the at least one business report and the at least one new business report with the common at least one new data point markers.

17. The method of claim 12, further comprising: creating at least one new business report; building a new business navigation map; linking a previously created at least one business report from a repository to the new business navigation map; and storing the new business navigation map, the link between the previously created one business report to the new business navigation map, and the at least one new business report in at least one database.

18. The method of claim 12, further comprising: viewing the at least one business report; loading a business navigation map; and gathering information to dynamically create a link to the business navigation map.

19. The method of claim 12, further comprising: loading a previously created business navigation map, linking the at least one business report to the business navigation map; and storing the business navigation map in at least one database.

20. The method of claim 12, further comprising: updating a business navigation map by locating the business navigation map; adding at least one new business report to the business navigation map to create said updated business navigation map; and storing the updated business navigation map in at least one database.

* * * * *